United States Patent [19]

Gastmann

[11] Patent Number: 4,945,600
[45] Date of Patent: Aug. 7, 1990

[54] PANE WIPER APPARATUS

[75] Inventor: Günter Gastmann, Essen, Fed. Rep. of Germany

[73] Assignee: Cedar Grove Limited, Gibraltar

[21] Appl. No.: 69,524

[22] Filed: Jul. 2, 1987

[30] Foreign Application Priority Data

Jul. 3, 1986 [DE] Fed. Rep. of Germany ....... 3622279

[51] Int. Cl.$^5$ ............................ B60S 1/26; B60S 1/38; B60S 1/44; B60S 1/50
[52] U.S. Cl. ............................. 15/250.01; 15/250.06; 15/250.07; 15/250.15; 15/250.24; 15/250.29; 15/250.36
[58] Field of Search .................. 15/36, 250.01, 250.24, 15/250.25, 250.26, 250.29, 250.36, 250.06, 250.07, 250.15

[56] References Cited

U.S. PATENT DOCUMENTS

| 2,896,245 | 7/1959 | Hopponen | 15/250.36 X |
| 3,086,239 | 4/1963 | Peras | 15/250.29 |
| 3,623,178 | 11/1971 | Kurz | 15/103 X |

FOREIGN PATENT DOCUMENTS 2753003  6/1978  Fed. Rep. of Germany ... 15/250.24

Primary Examiner—Harvey C. Hornsby
Assistant Examiner—M. Spisich
Attorney, Agent, or Firm—McGlew and Tuttle

[57] ABSTRACT

The pane wiper apparatus for the windshield of a motor vehicle has a driven wiper implement in the form of a wiper strip which is moved over the height of the windshield. The strip is guided and driven by guide and drive elements arranged in side or edge regions of the windshield, and a prescribed tension is imparted to the wiper strip. The wiper can be guided so that it does not lift off of the pane surface even at high vehicle or operating speeds, and the wiped field is optimized.

18 Claims, 5 Drawing Sheets

PANE WIPER APPARATUS

BACKGROUND OF THE INVENTION

Field Of The Invention

This invention relates in general to pane cleaning or wiping apparatus and in particular to a new and useful pane wiping apparatus particularly for motor vehicles.

The invention relates particularly to a pane wiper apparatus for wiping a pane, particularly a window pane such as a windshield or rear window of a motor vehicle, said wiper apparatus comprising a wiper implement which moves reciprocally over the window, and a drive motor for the wiper implement.

Pane wiper apparatus are understood to include single-arm wipers as well as double wipers and pantograph wipers. The customary embodiment of such apparatuses comprises a crank-and-connecting-rod drive, a wiper arm, and a wiper bow with wiper blade. A problem invariably presented is the perpendicular application force of the wiper blade, and the distribution of this force, on a strongly curved windshield. For aerodynamic reasons, windshields tend, with each new model, to be more curved. The problem is intensified at high vehicle speeds, where often the optimal effect of the wiper cannot be achieved, because the wiper tends to be lifted from the surface to be wiped. Further, the cleaning effect is interfered with by acids, salts, oils, greases, etc., so that a window washer device with spray nozzles is also required on the hood. Moreover, often optimal visibility is not achieved because large regions are completely unwiped. The invention is intended to relieve these problems.

SUMMARY OF THE INVENTION

The invention provides a pane wiper apparatus described, wherein the wiping implement is amply pressed against the surface of even a highly curved window, particularly a windshield, and lifting of the wiper implement from the surface at high speed is avoided, and wherein further the configuration of the wiped field is optimal, and the structure and functioning of the apparatus are very simple.

This problem is solved according to the invention in that the wiper implement is in the form of a wiping strip which moves over the height or width of the window, and the strip is guided and driven in the region of the lateral edges or the upper and lower edges, of the window, with a prescribed tension on the strip. The result of these inventive features is that the known arrangement with a crank-and-connecting-rod drive, wiper arm, wiper bow, and wiper blade is avoided, in favor of a wiper strip which is moved over nearly the entire area of the window or windshield. Such a wiper strip can readily be stretched over the width or height of the window in such a way as to prevent it from lifting from the surface even at high vehicle speeds, in that its wind resistance is relatively low. Problem-free distribution of the surface application force is always assured, leading to substantially higher service life of the inventive wiper strip compared to ordinary wiper blades. In the inactive position, the wiper strip is practically invisible; and when in operation, it is much less of an annoyance than a wiper arm with a wiper bow and wiper blade. Moreover, the inventive wiper strip is suitable for all types of vehicles, even those with highly curved windows and windshields, and its operation is practically noiseless. It is also possible, by appropriate control of the motor, to time the passes of the wiper at intervals, as well as to reverse direction of the reciprocal translation movements.

Other features of the invention will be set forth hereinafter. According to one such feature, with evident significance, the wiper strip is in the form of an endless band, and passes over pulleys disposed on both sides of the window, which pulleys are guided on guide rails in such a way that they are maintained at essentially the same altitude on both sides of the window, wherewith one of the pulleys is driven. It is also possible within the scope of the invention to employ a plurality of wiper strips which move in reciprocal translation movements over the window in overlapping fields thereof, in arrangements which depend on the size and shape of the given window, wherewith the guide rails extend over the height or width of the window.

According to one embodiment, the endless wiper strip passes over a pair of spaced pulleys on each of the two sides of the window, and in the case of a trapezoidal window the distance between the members of the pair of pulleys disposed on each of the two sides of the window increases or decreases, by means of the driven pulleys on both sides, as the wiper strip is translated from its top position to its lower position in accordance with the change in the effective length of the wiper strip, whereby the effective wiper strip length is continuously adjusted to the changing width of the window. Thus, in the case of a trapezoidal window, the endless wiper strip which is guided over four pulleys also forms a trapezoidal figure, which is relatively high or wide when the wiper strip is in its upper position and is relatively shallow when the wiper strip is in its lower position because in the lower position a greater effective wiper strip length is required. According to a refinement of the invention, with evident significance, the wiper strip passes over a single pulley on one side of the window and over a double pulley on the other side, whence it runs to a washing compartment in which it passes over additional guide pulleys and through a washing liquid; and a tensioning device or multipulley strip idling storage arrangement for the wiper strip is provided in the compartment, wherewith one of the guide pulleys is driven by a controlled-speed motor. This washing compartment system substitutes for the customary windshield washer apparatus with spray nozzles. If the wiping is performed at intervals, no grease film forms on the windshield and occasional single wipes may be executed to remove any grease buildup on the windshield. Further, means of automatic deicing may be provided. A deicing liquid may be employed in addition to the washing liquid, to prevent freezing of the wiper strip to the window and to keep the window ice-free. When the wiper strip is moved slowly through the deicing and washing liquid, it picks up more deicing and washing liquid; when it is moved faster it picks up less. Accordingly, the dosing of these liquids can be controlled via the speed or longitudinal driving of the wiper strip. Also, it is a simple matter to house the washing compartment inside the engine compartment, at an arbitrary location therein, whereby a space-saving arrangement is achieved. Further, one may provide the washing compartment with a reservoir for the washing and deicing liquid, and inlet and outlet facilities and a pump for same. Advantageously, the wiper strip is in the form of a toothed belt, with the pulleys being in the form of spur gears. In this connection, according to the invention the guide rails may have toothed racks on both sides, with the pulleys having pinions on their axles which pinions engage the racks and travel around a closed guide path which surrounds the guide rails. In this way, the reciprocal translation of the wiper strip over the window is produced. The embodiment comprising a toothed belt and rack and pinions ensures problem-free movement of the wiper strip. According to the invention it is further proposed that the toothed wiper strip have an elastic insert comprised of rubber, plastic, or steel material, and a contact surface comprising bristles and/or felt material; or that the wiper strip have a segmented contact surface comprised of rubber, plastic or the like. In this way the washing action is improved. In principle it is also possible for the wiper strip to be in the form of an elastic or inelastic cable. In such a case, to compensate for slippage the single pulley can be provided with a slip clutch, or may have a smaller circumference than the double pulley so as to rotate slightly faster than the double pulley (e.g. by 3%).

The advantages afforded by the invention may be regarded as basically that the pane wiper apparatus for panes and particularly for windows such as windshields or rear windows of vehicles has a high and evenly-distributed surface pressure even against highly curved windows, so that it does not lift off of the surface even at high speeds; and has a compact construction. Moreover, the effective wiping field is nearly 100%, and the mechanical installation cost is minimal. It is inexpensive to manufacture, and has outstanding service life. Also, it avoids theft problems which are common with ordinary wiper blades.

In accordance with the invention, there is provided a pane wiper for wiping a pane such as the windshield or rear window of a motor vehicle which comprises guide elements arranged at each respective opposite extremity of the pane for guiding an endless member between them which carries a wiper strip which is movable over the pane between the guide elements and an arrangement including tension means associated with the endless guide member for maintaining it under tension.

The invention includes advantageously guide elements on each side in the form of a rack defining an endless path which is engaged by a pinion of rollers over which the endless member is guided. In this manner, the roller with the guide members cause the motion of the wiper element backwardly and forwardly over the pane and then downwardly or transversely as the gear members of the rollers move along the racks.

Accordingly it is an object of the invention to provide an improved pane wiper which includes an endless guide member or wiper member which is guided between guide elements on each extremity of the pane.

A further object of the invention is to provide a pane wiper particularly for wiping a pane such as a windshield or rear window of a motor vehicle which is simple in design, rugged in construction and economical to manufacture.

The variuos features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
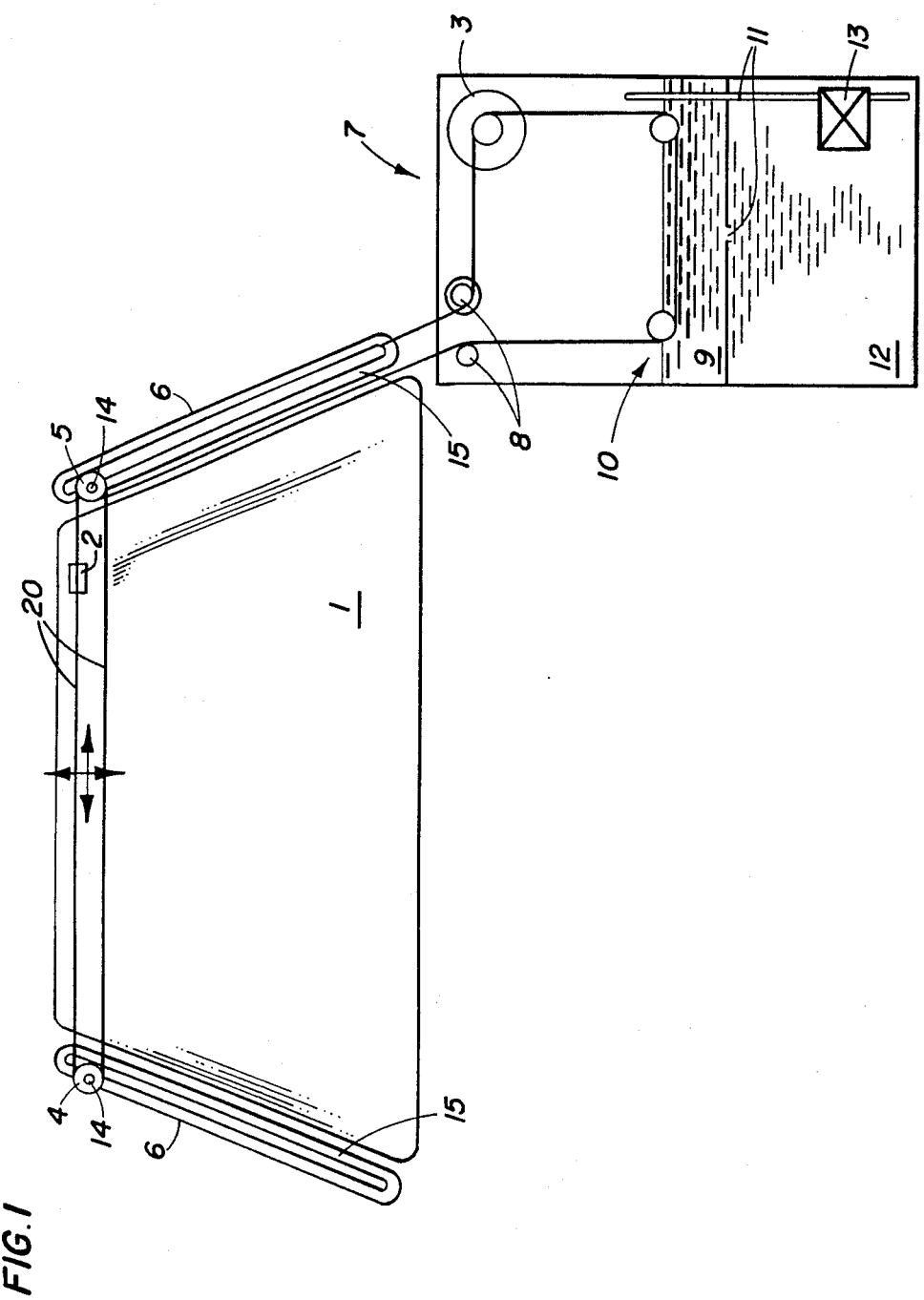
FIG. 1 is a schematic illustration of an inventive pane wiper apparatus.

Referring to the drawings, in particular, the invention embodied therein as indicated in FIG. 1, provides a pane wiper for wiping a pane such as a windshield or rear window 1 of a motor vehicle and which comprises first and second guide elements 6,6 arranged at respective opposite extremities of the pane 1. An endless guide member 2 is guided between the first and second guide elements 6,6 and it includes a wiper strip portion 2' which is movable over the pane 1 between the guide elements 6,6. In addition, the arrangement includes tensioning means generally designated 10 associated with the endless guide member 2 for maintaining the guide member under tension and holding the wiper strip to the pane 1. In accordance with the invention, the tensioning means is effective on the endless guide member 2 in an arrangement which includes roller elements 4 and 5 which have pinion gears secured to the shaft thereof which engage an endless rack formation of the guide elements 6,6.

Figure 2:
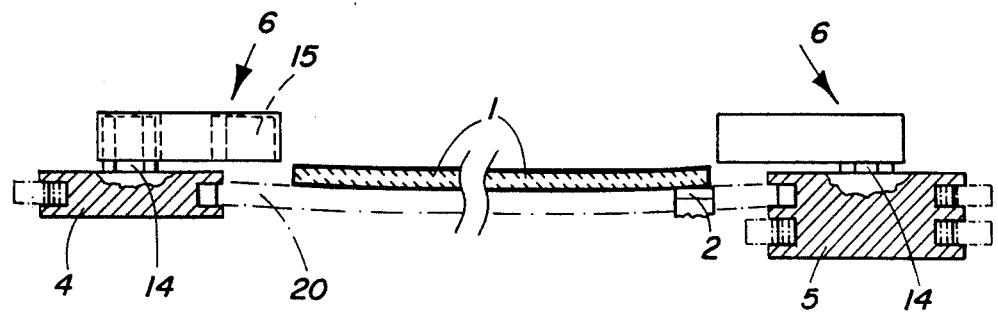
FIG. 2 is a plan view of the subject of FIG. 1, in partial cross section through single and double pulleys.
Figure 3A:
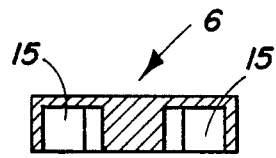
FIG. 3a is a cross section through the guide rails shown in FIG. 2.
Figure 3B:
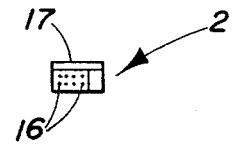
FIG. 3b is a cross section through the strips of FIG. 2.

The drawings show a pane wiper apparatus for wiping the window 1, particularly a windshield, of a motor vehicle. The apparatus comprises a wiper strip portion, 2 movable reciprocally on the window 1, and a drive motor 3 for the wiper. The wiper implement is in the form of the strip or band 2' which is moved over the height or width of the window 1. The wiper strip 2' is guided and driven, with a prescribed tension, by guide and drive means disposed in the region of the lateral edges or of the upper and lower edges of the window 1. The strip 2' is an endless strip which runs over pulleys or rollers 4, 5 disposed on both sides (or top and bottom) of the window. The pulleys 4, 5 are guided at generally equal altitudes on guide rails 6 also disposed on both sides (or top and bottom) of the window 1, which rails extend over the height (or width) of the window 1. At least one of the pulleys 4 or 5 is driven and it advantageously comprises a spur gear driving a toothed belt wiper strip 2'. The pulleys 4 and 5 shown in FIG. 2 indicate spur gears and in some instances can comprise toothed racks which would be as similar construction to the pulleys and which may be driven by synchronous motors on each side of a window 1 shown in FIG. 9.

It is provided according to an embodiment of the invention (not shown) that the endless wiper strip 2' runs over two spaced pulleys on each of the two sides (or top and bottom) of the window 1, and in the case of a window with a trapezoidal shape the distance between the individual pulleys on a given side is increased or decreased, as the wiper strip position is moved from top to bottom (side to side), corresponding to the change in effective strip length, by means of independently driven pulleys on both sides of the window.

According to the embodiment illustrated in FIG. 1, it is provided that the wiper strip 2' is guided on one side of the window 1 by means of a single pulley 4, and on the other side by means of a double pulley 5, whence it passes into a washing compartment 7 in which it passes over additional guide pulleys 8 and through a washing and deicing liquid 9. A tensioning device 10 or multipulley strip idling storage arrangement for the wiper strip 2' is disposed in the washing compartment 7, and one of the guide pulleys 8 is driven by a controlled-speed drive motor 3 having a guide pulley 8 secured to its drive shaft. The tensioning device 10 or multipulley strip idling storage arrangement is required to partially or completely compensate for variations in length of the wiper strip 2' over the width of the window 1 [i.e., as the strip moves over positions of window 1 having different widths]. Such variations in length occur particularly with windows 1 of trapezoidal shape.

Feed and drain facilities 11 are provided in the compartment 7, for connecting said compartment to a reservoir 12 and filter for the washing and deicing liquid 9; and a pump 13 is provided.

The wiper strip 2' is in the form of a toothed belt, with the pulleys 4, 5 being in the form of spur gears for engaging said belt. Further, both of the guide rails 6 are in the form of (externally) toothed racks, with the axles of the pulleys 4, 5 having pinions 14 which engage the racks 6, wherewith the pulleys 4, 5 travel around respective closed guide paths or (channels) 15 defined by the respective racks 6. In this way the reciprocating wiping movement of the strip 2' over the window 1 is produced. This arrangement is illustrated in FIG. 1. The toothed wiper strip 2' has an elastic insert 16 comprised of rubber or plastic material, and a contacting surface 17 comprised of bristles and/or felt, which surface 17 presses problem-free against even a highly curved window 1 with the required surface pressure, when the strip 2' is tensioned, thereby producing optimal cleaning. The scope of the invention includes the possibility of providing one motor for driving the strip 2' longitudinally over its bearing system or pulleys etc. and a second motor for the reciprocal transverse translation of the strip 2'. According to a preferred embodiment, with evident significance, electronically controlled drive means with mutually synchronous motors are provided on both sides of the pane or window which is to be cleaned, for the longitudinal driving and/or reciprocal translation of the wiper strip 2', whereby even panes of large area can be cleaned without problems.

Figure 4:
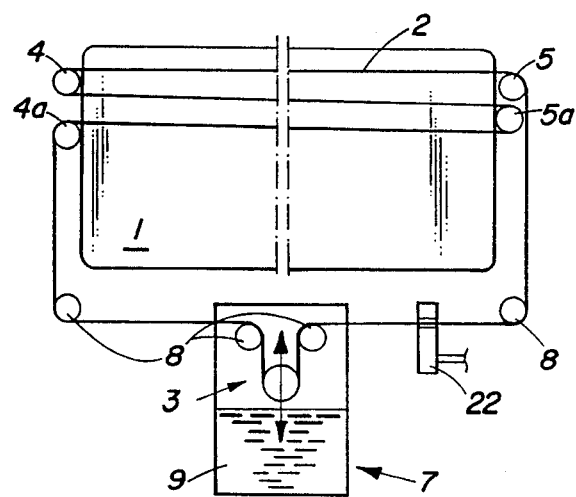
FIG. 4 is a schematic view of a refinement of another embodiment of FIG. 1.

According to a preferred embodiment of the invention, shown in FIG. 4, the wiper strip 2 is passed back and forth over the window 1 in a wave configuration around a plurality of pulleys (4, 4a, 5, 5a) disposed on both sides of said window, in order to optimize the cleaning effect. There is also a basic possibility of employing a plurality of wiper strips 2 and pane wiper apparatuses, depending on the size of the given window 1.

Figure 5:
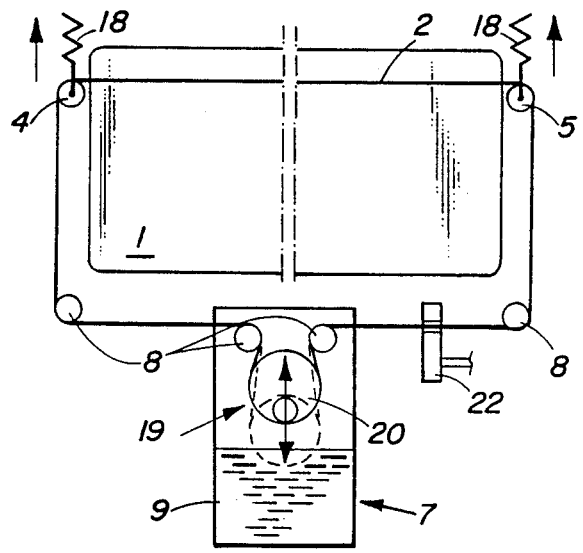
FIG. 5 is a schematic view of a second embodiment of the invention.
Figure 7:
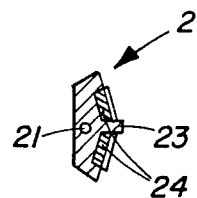
FIG. 7 is a cross section through an alternate embodiment of the wiper strip.
Figure 6:
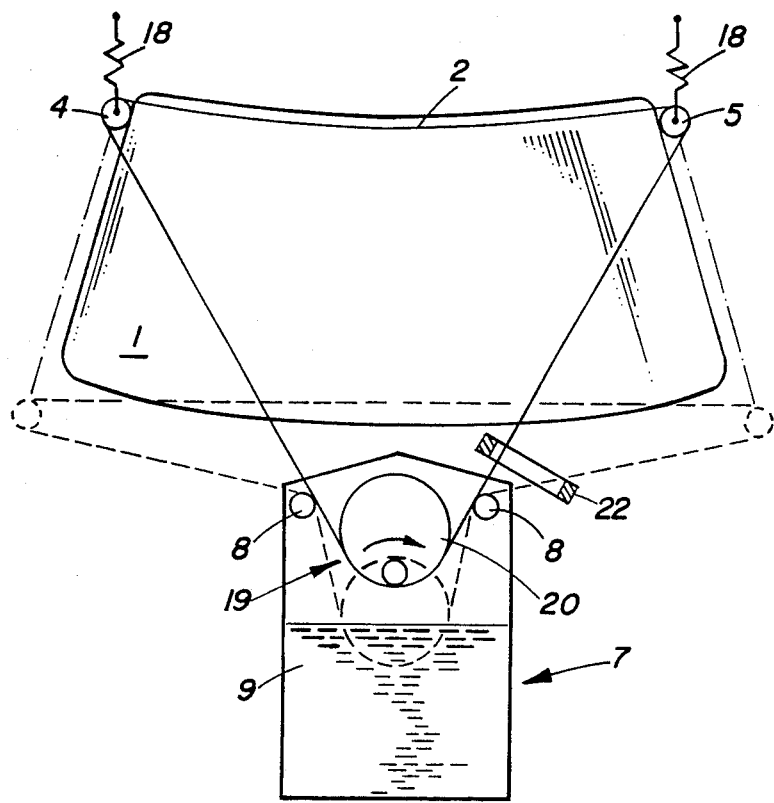
FIG. 6 is a schematic view of a third embodiment of the invention, wherein the wiper strip is guided in a triangle configuration over the window.
Figure 8:
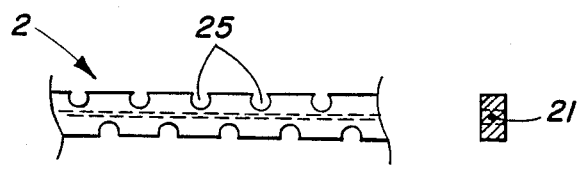
FIG. 8 is a second alternate embodiment of the wiper strip, having perforation-like notches at the edges

According to a refinement of the invention, as shown in FIG. 5, with evident significance, spring-loaded suspension means 18, e.g. spring-loaded reel means or "roll springs", are provided for the pulleys 4 and 5; or 4a and 5a which are guided on both sides of the window 1, to hold said pulleys in i.e., to urge said pulleys toward their upper, initial position. A motor 19 for the reciprocal translations of the wiper strip 2 then has an eccentric member 20 around which the endless strip 2 passes, which member 20 pulls the wiper strip 2 which is passed across the window 1 and the pulleys 4, 5 disposed on both sides synchronously and downward against the spring force, whereby the strip 2 is translated over the window 1. Then member 20 releases strip 2 and said pulleys 4 and 5, whereupon the spring-loaded suspension means 18 cause the strip 2 to return to the upper, initial position; and so forth. Thus, in synchronized alternation the spring-loaded suspension 18 and the eccentric member 20 produce the reciprocal translational wiping movement of the wiper strip 2 over the window 1. A metal strip 21 or other electrically conducting insert may be incorporated in the wiper strip 2, and the strip 2' may be passed through a heating device 22, which may be, e.g., an electromagnet yoke which can be swung into place. Such an electromagnet yoke acts as a primary winding, and the wiper strip 1 (metal strip 21) in the form of a closed loop acts as a secondary winding. Heating of the wiper strip 2 is useful when frost is present, whereby the heating is carried out to deice the wiper strip 2. According to a refinement, the wiper strip 2 has a central contacting ridge 23 comprised of rubber or plastic material, and has felt inserts 24 on both sides of said ridge, with the metal strip 21 or similar heating conductor being disposed in the center.

According to a preferred embodiment of the invention, the wiper strip 2' has profiled recesses 25 (e.g., riffles, grooves, or perforation-shaped notches) on the outer surfaces of its two wiping edges. In this way, bending stresses are reduced when the wiper strip 2 is guided over the pulleys (4,5) and the eccentric member 20, and also the aquaplaning hydroplaning effect on a wet window 1 is reduced. Further, according to an exemplary embodiment of the invention, the wiper strip 2 is guided in a triangle configuration over the pulleys (4,5) on both sides of the window 1, and over the eccentric member 20. Such a guiding configuration reduces the number of guiding elements, and also results in improved cleaning of the window in the region of the often particularly soiled corners thereof, because the wiper strip 2 is not only moved up and down over the window 1 but in the corner regions it is also guided laterally and at angles, as a consequence of the triangular arrangement of the wiper strip 2.

Figure 9:
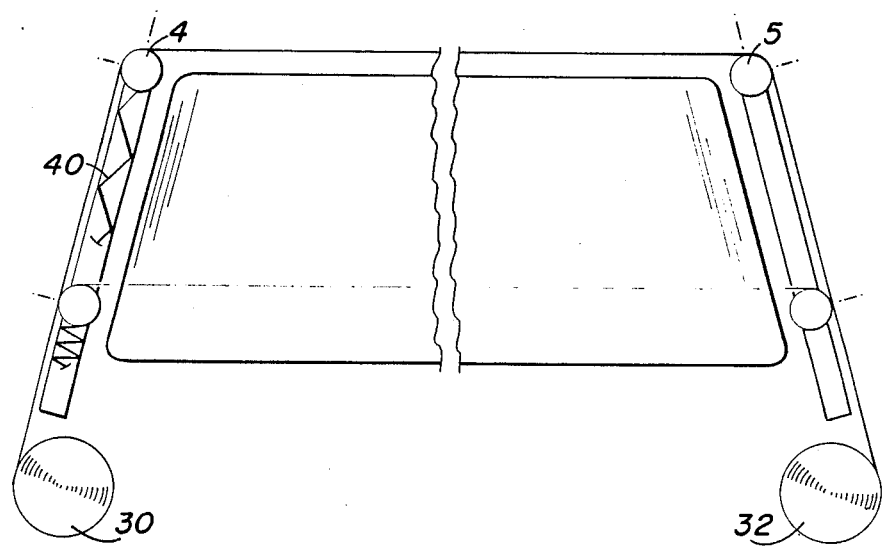
FIG. 9 is a schematic illustration of a wiper arrangement with two synchronously operating motors.
Figure 10:
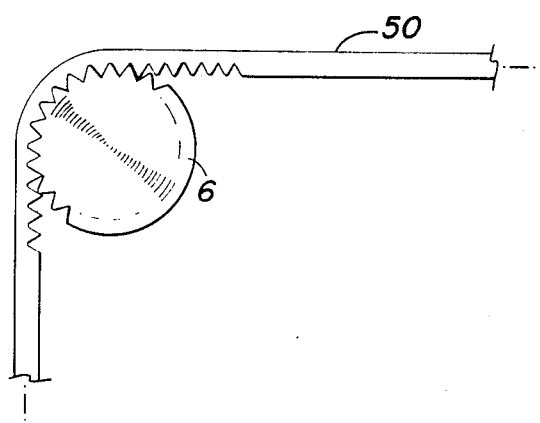
FIG. 10 is a front view showing the toothed belt engaging a pulley according to the invention.

FIG. 9 shows two synchronously operating motors 30 and 32 which operate in the opposite and alternating sense of rotation. In the starting position (wiper belt in the top position), the motor 30 rotates counterclockwise and the motor 32 rotates clockwise. This action exerts forces on the wiper belt such that the rollers 4,5 on both sides of the windshield are pulled downwardly against the action of a spring cyliner or the like 40. The lower power is indicated by dashed line. The two motors subsequently rotate in the opposite direction such that rollers 4,5 are pushed back into their starting position.

The wiper belt may be designed as a toothed belt 50 engaging a roller 6 designed as a pinion.

It is additionally of significance that the inventive pane wiper apparatus can be employed to wash modern automobile body shapes, whereby the entire body may be washed, or the washing may be performed in sections.

Further, heating means (not shown) for heating the deicing liquid can be provided in conjunction with the washing compartment 7.

While specific embodiments of the invention have been shown and described in detail to illustrate the application of the principles of the invention, it will be understood that the invention may be embodied otherwise without departing from such principles.

I claim:

1. A pane wiper apparatus for wiping a pane, particularly a window pane such as a windshield and rear window of a motor vehicle, said wiper apparatus comprising a wiper implement which moves reciprocally over the window, and drive motor for moving the wiper implement; said wiper implement being in the form of a wiping strip which is moved over the height and width of the window, and guide and drive means along the edges of the window over which said strip is guided and driven, and means for applying a tension on said strip, a washing compartment associated with said guide means and including a reservoir for washing liquid, a pump associated with said washing liquid having a filter connected to a washing compartment.

2. A pane wiper apparatus for wiping a pane, particularly a window pane such as a windshield and rear window of a motor vehicle, said wiper apparatus comprising a wiper implement which moves reciprocally over the window, and drive motor for moving the wiper implement; said wiper implement being in the form of a wiping strip which is moved over the height and width of the window, and guide and drive means long the edges of the window over which said strip is guided and driven, and means for applying a tension on said strip, said wiper strip comprising an endless toothed band and including an elastic insert having a contact surface with bristles.

3. A pane window apparatus according to claim 2, wherein said wiper strip is in the form of an endless band, and including pulleys disposed on both sides of said window, guide rails on which said pulleys are guided in such a way that they are maintained at essentially the same altitutde on both sides of said window, and means for driving at least one of said pulleys.

4. A pane wiper apparatus according to claim 3, wherein said wiping strip comprises a toothed belt, said pulleys comprising spur gears, engageable with said belt.

5. A pane wiper apparatus according to claim 2, wherein said endless wiper strip passes over a pair of spaced pulleys on each of the two sides of said window, said pulleys being held apart by means of compression springs, and wherein when said window is trapezoidal the distance between the members of the pair of pulleys being disposed on each of two sides of said window so that the spacing increases and decreases by means of driven pulleys on both sides as said wiper strip is translated from its top position to its lower position in accordance with the change of the effective length of said wiper strip.

6. A pane wiper according to claim 2, wherein said wiper strip passes over a single pulley on one side of said window and over a double pulley on the other side and hence and including a washing compartment in which it passes over having guide pulleys extending through at least one washing liquid, and wherein said tensioning means includes a multipulley strip idling storage arrangement for the wiper strip provided in said compartment with one of said guide pulleys being driven by a control speed motor.

7. A pane wiper apparatus according to claim 6, wherein said washing compartment has associated with it a heating device for deicing liquid.

8. A pane wiper according to claim 2, wherein said guide and drive mean includes having toothed racks extending on both sides, pulleys having pinions which engages said racks and travel around said racks in a closed path.

9. A pane wiper according to claim 2, wherein said wiper strip comprises an elastic cable.

10. A pane wiper according to claim 2, wherein said wiper strip is driven by drive means including a motor.

11. A pane wiper according to claim 2, wherein said guide and drive means comprises an electronically controlled drive including synchronous motors provided on both sides of said window for the longitudinal driving and reciprocal translation of said wiper strip.

12. A pane wiper according to claim 2, wherein said wiper strip is passed over said window in a multiple number of paths in a wave configuration and including a plurality of guide pulleys disposed on both sides of said window.

13. A pane wiper according to claim 2, wherein said guide and drive means includes a plurality of guide pulleys on each side of said window and including spring-loaded suspension means for said guide pulleys on both sides of said window for holding said pulleys and a motor for the reciprocal translation of said wiper strip having an eccentric member around which said endless strip passes which member pulls the wiper strip synchronously in a direction against the force of said suspension mean.

14. A pane wiper according to claim 2, including a metal strip electrically conducting insert integrated into said wiper strip, aid wiper strip passing through a heating device comprising an electromagentic yoke which can be swung into place.

15. A pane wiper according to claim 2, wherein said wiper strip comprises a central contacting ridge of an elastic material and felt inserts on both sides of said ridge and including a central heating conductor therein.

16. A pane wiper according to claim 2, including a washing compartment associated with said guide and drive means into which said endless member is passed and including heating means in said washing compartment for deicing liquid.

17. A pane wiper according to claim 2, wherein said wiper strip has a wiping edge on each side and has profiled recesses on both sides of its wiping edges.

18. A pane wiper according claim 2, wherein said elastic insert comprises a pad made of an elastic material.

19. A pane wiper according to claim 2, wherein said strip comprises an electrically conductive material and includes a central pad portion and an insert portion on each side of said central pad and is at least partially heat and electrically conducting.

* * * * *